United States Patent [19]

Capelle

[11] Patent Number: 4,719,071
[45] Date of Patent: Jan. 12, 1988

[54] METHOD FOR MONITORING THE PRODUCTION OF ELONGATE PROFILES

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 770,274

[22] Filed: Aug. 28, 1985

[30] Foreign Application Priority Data

Sep. 22, 1984 [DE] Fed. Rep. of Germany ....... 3434904

[51] Int. Cl.⁴ ............................................. B29C 47/92
[52] U.S. Cl. .................................. 264/40.2; 264/40.4; 264/40.5; 264/40.7; 264/171; 264/177.19; 264/237; 425/140
[58] Field of Search ............... 264/40.4, 40.2, 40.7, 264/40.5, 171, 177.19, 237; 425/140, 141

[56] References Cited

U.S. PATENT DOCUMENTS

| | | | |
|---|---|---|---|
| 2,382,177 | 8/1945 | Schanz | 425/131.1 |
| 3,250,841 | 5/1966 | Reinhart | 264/342 R |
| 4,097,566 | 6/1978 | Bertin et al. | 264/40.7 |
| 4,171,193 | 10/1979 | Rahlfs | 425/71 |
| 4,515,738 | 5/1985 | Anders | 425/140 |

FOREIGN PATENT DOCUMENTS

2201631 8/1973 Fed. Rep. of Germany .

Primary Examiner—Jeffery Thurlow
Attorney, Agent, or Firm—Schwartz, Jeffery, Schwaab, Mack, Blumenthal & Evans

[57] ABSTRACT

A method particularly suitable of monitoring the production of elongate profiles which are formed from one or more mixtures of rubber or thermoplastic material in an extrusion head which is fed by one or more extrusion devices is disclosed as in an apparatus which is particularly suitable for carrying out such a method. During production, the strip passes through a cooling path or station in which longitudinal shrinkage thereof occurs. The desired shrinkge is known and the actual shrinkage is monitored by suitable means. These means are operatively connected to a regulating or control device. When leaving the head, the profile passes over a weighing device which determines the weight per unit length thereof. The weighing device is also operatively connected to the regulating or control device. If a deviation from the desired shrinkage in the zone or station is ascertained, the regulating device sets a new, corrected, desired weight per unit length value to be achieved at the weighing device. To achieve this desired weight per unit length, the drives for the extrusion devices are each adjusted by a uniform mount by the regulating or control device. By achieving the desired weight value, the desired amount of shrinkage in the cooling path or station is achieved.

3 Claims, 4 Drawing Figures

METHOD FOR MONITORING THE PRODUCTION OF ELONGATE PROFILES

FIELD OF THE INVENTION

The present invention relates to a method for monitoring the production of elongate profiles and to an apparatus suitable for carrying out such a method. More particularly, the monitoring method and apparatus of the present invention are designed for use when the elongate profiles are formed from one or more mixtures of rubber or thermoplastics materials.

BACKGROUND OF THE INVENTION AND PRIOR ART DISCUSSION

The production of elongate profiles from one or more mixtures of rubber or thermoplastics materials utilising an extrusion head to which the mixture or mixtures are supplied by one or more extrusion devices is known. It is also known to cool the profile by conveying it through a cooling zone comprising a plurality of conveyor belts. An apparatus used for producing a profile in the form of a tread strip from two different rubber mixtures is disclosed in German Patent Specification No. 2,201,631. In such prior specification, two separate screw presses, which are disposed one above the other, feed different rubber mixtures to an extrusion head where the material mixtures are combined and extruded therefrom in the form of a tread strip. U.S. Pat. No. 2,382,177 also shows such an arrangement.

The extruded tread strip is then conducted over a tread strip weighing device. Such weighing is achieved by weighing the amount of material located on a rotating conveyor belt. The desired weight of the tread strip is known and if the actual weight deviates therefrom, a certain degree of correction can be achieved. Thus, if the actual weight is higher than the desired weight, the rate of transfer of the tread strip can be increased. This effectively causes a weight reduction to be achieved because the strip is elongated.

In practice, therefore, such apparatuses for producing tread strips have been operated at discharge rate which is slightly in excess of a desired rate. The extruded tread strip is then brought to its desired weight as a result of the elongation.

The only regulation of the characteristics of the tread strip profile offered by such an arrangement is that the extruded tread strip can be elongated or compressed by increasing or reducing the rate of transfer of the strip. However, the rate at which the tread strip is discharged from the nozzle must be considered as the minimum rate for the tread strip transfer apparatus and, for the purpose of regulating the profile thickness, it is vital that the rate of transfer does not fall below this minimum rate.

U.S. Pat. No. 4,097,566 also discloses a method and apparatus for producing profiles formed from a plurality of mixtures. The method which is described therein is highly complex having regard to the regulating techniques employed and, additionally, has one fundamental disadvantage. If, for exaple, one of the weighing devices or one of the measuring devices used for measuring the width of a deflection loop ascertains that the produced profile does not have the desired dimensions, adjustment can still only be effected by either extending or compressing the profile strip.

Each extension or elongation operation on the profile strip, produced, for example, by accelerating the conveyor belts, provides the profile strip with the correct weight but with totally inaccurate and uncontrolled dimensions. This is evidenced by the uncontrolled and irregular longitudinal shrinkage which occurs when the profile strip passes through the cooling zone.

An additional disadvantage of such a known arrangement resides in the fact that the apparatus used is very long. Accordingly, from the time when the deviation from the desired weight of the profile strip is ascertained to the time of its correction, a large amount of unusable material has passed through the apparatus. This is because a large amount of profile strip passes between the particular measuring point and the source of error, that is to say, the point of deviation from the desired value. Such profile strip portion is, therefore, useless.

Basically, it must be stressed that it is not feasible to extend an extruded profile to compensate for variations in thickness of the profile because each extension operation produces, during cooling, longitudinal shrinkage which is too inaccurate and too uncontrollable.

OBJECTS OF THE INVENTION

The present invention seeks to provide a method and apparatus whereby the disadvantages of the above-described methods and apparatuses are overcome. In particular, the present invention seeks to ensure that deviations from the desired shrinkage value can be corrected very rapidly, so that only a minimum length of the profile is wasted.

In order to achieve such an aim, it is clear that actual physical action upon the profile strip which has been produced is totally unsuitable. Thus, as mentioned hereinbefore, elongation of the profile strip is an unsuitable way for correcting deviations in the thickness because each extension or pulling operation results in uncontrollable regressive shrinkage phenomena as the profile cools.

SUMMARY OF THE INVENTION

According to the present invention, there is provided a method of monitoring the production of elongate profiles formed from one or more mixtures of rubber or thermoplastics material in an extrusion head which is fed by one or more extrusion devices, the extruded profile being conveyed through a cooling path, comprising a plurality of conveyor belts, wherein the longitudinal shrinkage of the profile strip which occurs in the cooling path is monitored, the monitored values being transmitted to a regulating or control device and being compared with an estimated longitudinal shrinkage value, the control device being connected to a weighing device for measuring the weight per unit length of the strip and to individual drive means for each of the extrusion devices whereby, if the monitored shrinkage value deviates from the estimated value the regulating or control device sets a corrected desired weight per unit length value at the weighing device and uniformly influences each of the drive devices of the extrusion devices so as to cause the extruded strip to attain the corrected desired weight per unit length so as to ensure that the desired shrinkage in the cooling zone is achieved.

Also according to the present invention, there is provided an apparatus for monitoring the production of elongate profiles formed from one or more mixtures of rubber or thermoplastics materials comprising an extrusion head fed by one or more extrusion devices, each extrusion device having an adjustable drive, a regulating or control device controlled by a microprocessor, a device for measuring the weight per unit length of the profile and a cooling station which comprises a plurality of conveyor belts disposed one above the other and measuring means for measuring the curvature of the loop of the profile strip as it passes from one conveyor belt to the next, the measuring device for measuring the carvature of the loops of the profile being operatively connected to the regulating and control device, the regulating device also being operatively connected to the weighing device, the weighing device being disposed at the outlet of the profile strip extruder head, and to the adjustable drives of the extrusion devices.

By scanning the actual shrinkage values obtained in the cooling station, which may be up to 1.5% of the length of the profile, and then comparing such values with the desired shrinkage values by means of the regulating and control device which may, for example, be a microprocessor, the shrinkage values are determined from measuring point to measuring point.

Any deviation from the desired shrinkage values which are detected the regulating or control device during the cooling operation cause the regulating or control device to act upon the weighing device for determining weight per unit length of the profile, which weighing device is disposed at the outlet from the extrusion head, that is to say, the nozzle from which the profile issues. The weighing device receives, from the regulating or control device, a new desired weight value which has been upwardly or downwardly corrected accordingly.

This new desired value is obtained by simultaneously controlling the adjustable drives of each of the extrusion devices, such control can also be effected by means of the regulating or control device. This control is, of course, in strict dependence upon the new desired value transmitted to the weighing device by the regulating or control means.

If, for example, instead of the desired shrinkage of 1.5%, a shrinkage of 0.5% is ascertained in the cooling zone, such information is transmitted to the suitably programmed regulating or control device which, in turn, increases the desired weight per unit length at the weighing device. The amount of such increase is empirically determined and is expressed in the programming of the regulating or control device.

Similarly, if, for example, a shrinkage of 2% is ascertained, that is to say, 0.5% above the desired shrinkage value, the regulating device reduces the desired weight per unit length at the metric weighing machine by a suitable amount. This desired weight is also empirically determined and fixed in the program of the regulating or control device.

In either case, the actual weight per unit length is caused to correspond to the new desired weight per unit length by appropriately increasing or reducing the rate of drive of each of the extrusion devices. Such increases or decreases are by uniform percentages and are caused by the regulating or control device which is operably connected to each of the drives.

A reduction in the rate of drive of the extrusion device results in a reduction in the discharge therefrom and, accordingly, in a reduction in the weight per unit length. Similarly, an increase in the rate of drive will cause an increase in the weight per unit length.

BRIEF DESCRIPTION OF THE DRAWINGS

One embodiment of an apparatus in accordance with the present invention will be further described, solely by way of example, with reference to the accompanying drawings, in which.

DESCRIPTION OF PREFERRED EMBODIMENTS

Figure 1:
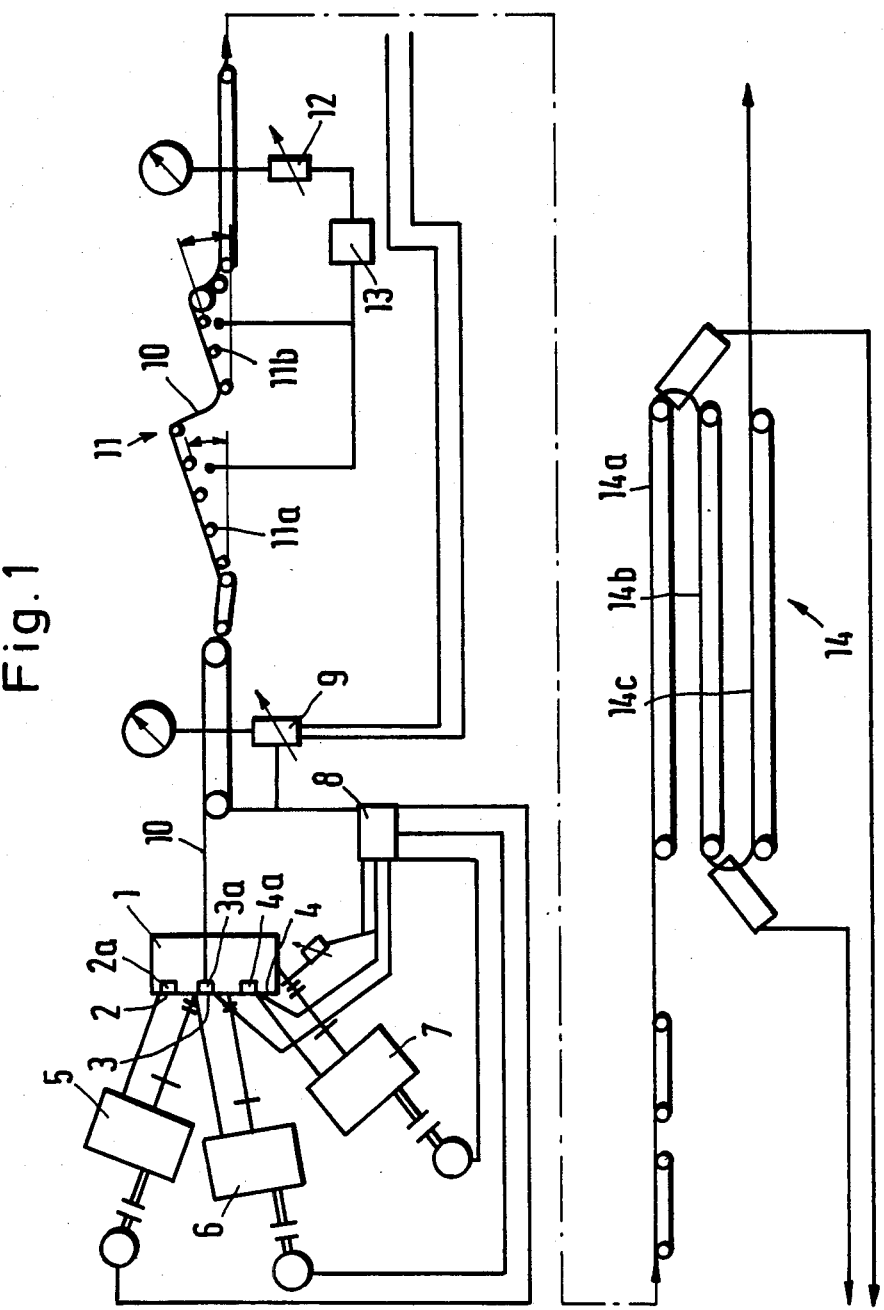
FIG. 1 is a schematic view of the embodiment of the apparatus.

In FIG. 1, there is shown a multiple extrusion head 1 suitable for producing, for example, tread strips for vehicle tyres. The head 1 is fed through three nozzles 2, 3 and 4 with different rubber mixtures such mixtures being supplied to the nozzles 2, 3 and 4 by three separate extrusion devices 5, 6 and 7 respectively.

In the region in which the mixtures enter the nozzles 2, 3 and 4, measuring devices 2a, 3a and 4a are provided for measuring the pressure and temperature at these locations.

Each of these measuring devices 2a, 3a and 4a is connected to a regulating or control device 8.

The extrusion devices 5, 6 and 7 are,obviously, driven and their drives are connected to the regulating or control device 8. By so doing, the device 8 can be utilised for modifying the particular rate of rotation of the screw in each of the extrusion devices.

A tread strip 10, which is formed from the three mixtures, is extruded from the multiple extrusion head 1 and passes over a weighing device 9. The weighing device 9 is also connected to the regulating or control device 8 and any deviation from predetermined desired weight of the tread strip per unit length is ascertained by the regulating device 8. Thus, for example, too low a weight per unit length indicates that too little material is being extruded from at least one of the nozzles 2, 3 and 4.

Deviations from predetermined desired values of the pressure and temperature in the extrusion devices 5, 6 and 7 are likewise detected by the measuring devices 2a, 3a and 4a and are transmitted to the regulating or control device 8.

If, for example, the weight per unit length determined by the weighing device 9 is ascertained as being too low by the regulating or control device 8, the regulating device 8 monitors the pressure and temperature values in the individual nozzles 2, 3 and 4 and compares them with the desired values.

If the regulating device 8 then ascertains that, for example, the pressure and the temperature in the nozzle 2 have dropped, this indicates that the extrusion device 5 is conveying less material than the prescribed amount. Accordingly, the tread strip, which is produced from all three mixtures, will have a lighter weight per unit length.

The temperature must also be ascertained because, with an increase in temperature, the material viscosity drops. In other words, the material becomes more fluid and the measured pressure of the material will drop although the quantity of material being conveyed does not decrease. In consequence, the weighing device does not ascertain any change in weight per unit length. However, if the scanned pressure drops without the temperature rising, this definitely indicates that the quantity of material conveyed through the screw of the extrusion device has decreased.

If, therefore, the scanned value for both the pressure and the temperature drop by at least a predetermined extent relative to the desired values, and such changes are ascertained by the regulating device, the rate of rotation of the appropriate screw is adjusted by the device 8.

The weight per unit length of the tread strip produced is, of course, lowered by an amount which corresponds to the amount of underfeed of the material by the extrusion device 5. Because both the weight per unit length of the tread strip and the pressure and the temperature, measured by measuring means 2a, in the nozzle 2 fed by the extrusion device 5 are too low, the regulating device 8 accordingly increases the rate of rotation of the screw in the extrusion device 5 by, for example, 1.5 revolutions per minute. The output from the extrusion device 5 is thus slightly increased. Such an increase is continued until the predetermined desired weight per unit length of the tread strip 10 has been restored.

After leaving the weighing device 9, the tread strip 10 reaches a shrinkage path 11 which, in this embodiment, is formed from two inclinedly disposed roller paths 11a and 11b.

In practice, approximately 8% of the total shrinkage of the tread strip of a total of about 9.5% is achieved in the shrinkage path 11. By altering the angle of inclination of the roller paths 11a and 11b, it is possible to influence the degree of shrinkage of the tread strip 10 in a desired manner. Thus, if the angle of inclination is large, more intensive shrinkage occurs and, if it is small, less shrinkage occurs.

Thereafter, the tread strip reaches a second weighing device 12 which measures weight per unit length. The device 12 is connected to a further regulating or control device 13. The device 13 is also connected to the roller paths 11a and 11b. Depending on deviations from the predetermined desired weight per unit length determined by the weighing device 12, the regulating device 13 adjusts the angle of inclination of the roller paths 11a and 11b of the shrinkage path 11.

The shrinkage path 11, the metric weighing device 12 and the regulating device 13 thus form an adjustment unit which operates independently of the other components.

After traversing the shrinkage path 11, the tread strip 10 reaches a cooling path 14 which is formed, for example, from three conveyor belts 14a, 14b and 14c disposed one above another.

During the cooling operation, the tread strip 10 is subjected to further shrinkage, the amount thereof being determined empirically, for example, 1.5% per unit length. The conveyor belts 14a, 14b and 14c are driven at fixed speeds which take into accurate account the fact that shrinkage of 1.5% should occur without giving rise to the possibility that the conveyor belts will cause elongation of the strip.

In order to determine the actual shrinkage of the tread strip 10 in the cooling path 14, light strips which create a light curtain or pivotal arm members which are connected to potentiometers may be utilised. Such devices are installed at one end of each of the conveyor belts 14a and 14b in order to control the curvature of the tread strip during its deflection from one conveyor belt to the conveyor belt disposed therebelow. By so doing, the shrinkage, and hence the length of the tread strip is controlled.

Figure 2:
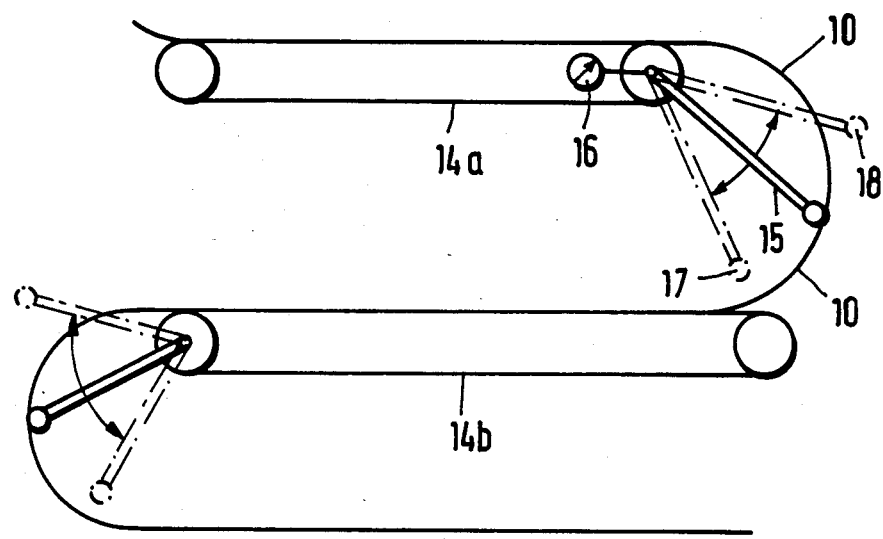
FIG. 2 is a schematic detail of part of the apparatus shown in FIG. 1 but on an enlarged scale and shows measuring devices in a cooling zone.
Figure 3:
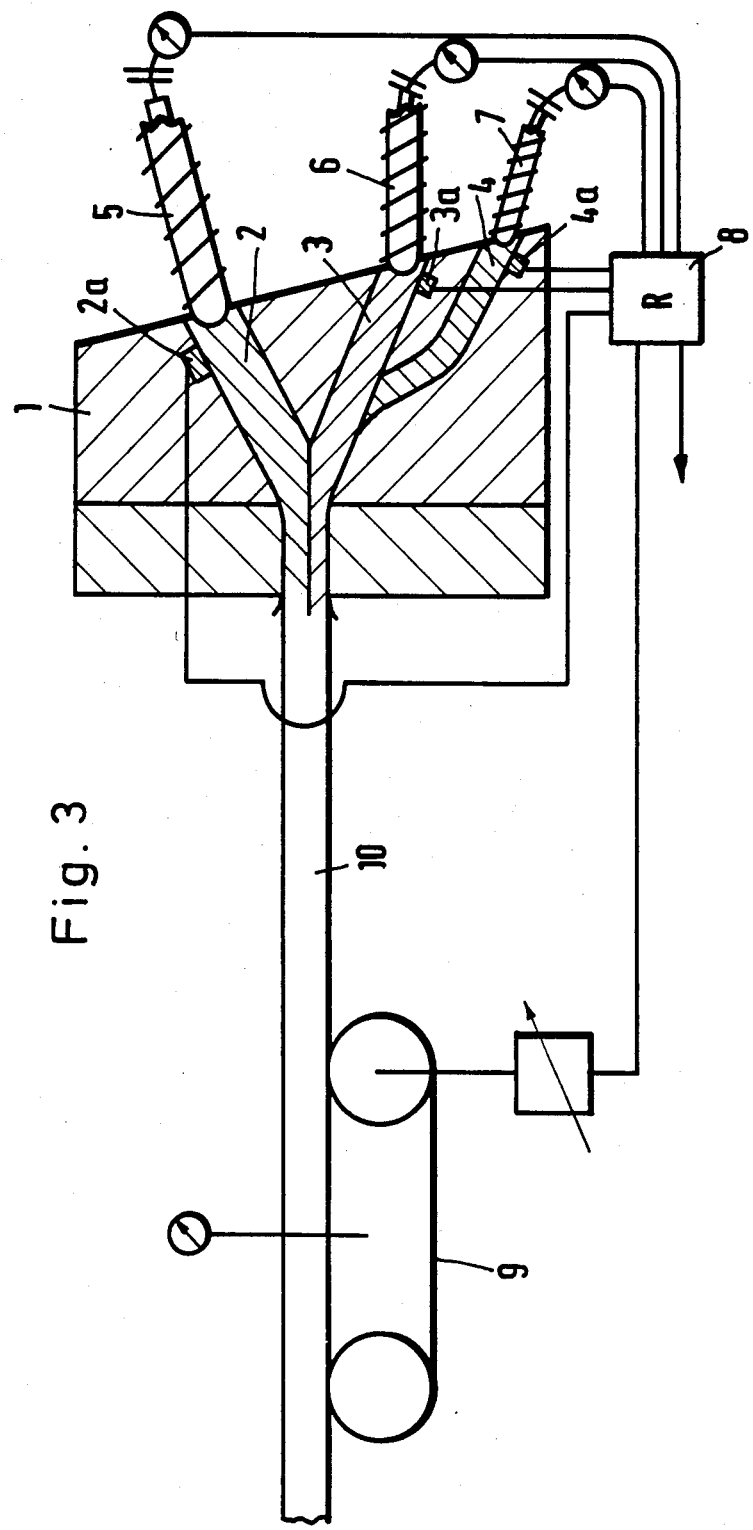
FIG. 3 is a schematic detail view of a further part of the apparatus shown in FIG. 1, again on an enlarged scale and shows three extrusion devices provided with a regulating or control circuit.

In FIG. 2, a portion of the cooling path is shown. In this arrangement pivotal arms 15 are provided, which arms are connected to a potentiometer 16 at their ends mounted on the pivot axis.

When the speed of the conveyor belt 14a has been fixed, the pivotal arm 15 will be located in its central position as shown in full lines in FIG. 2. If, however, the tread strip 10 then shrinks by an amount greater than the desired 1.5% and for which the speed of the conveyor belts 14a, 14b and 14c has been set, the pivotal arm 15 will be pulled by the strip 10, into its lower position 17. This pivotal movement is determined by the potentiometer 16 which transmits such information to the weighing device 9.

Such information is transmitted from the weighing device 9 to the regulating or control device 8. The indication, in such a case, is that the tread strip is, overall, too heavy.

The regulating device 8 is programmed in such a manner that the rates of rotation of the screws in the extrusion devices 5, 6 and 7 are each uniformly but minimally adjusted by approximately 0.5 revolutions per minute. Accordingly, the discharge is slightly increased in a uniform manner whereby the total shrinkage also decreases accordingly. In other words, the tread strip undergoes a slight elongation.

Since the shrinkage path 11 is set to provide a constant 8% shrinkage, the shrinkage is apparent in the cooling path 14 in such a manner that the tread strip 10 becomes, for example, 0.5% longer than would otherwise be the case. As a consequence thereof, the pivotal arm 15 is caused to move back into its central position and the tread strip shrinks again in accordance with the values which were initially predetermined and for which the speed of the conveyor belts 14a, 14b and 14c was set.

Figure 4:
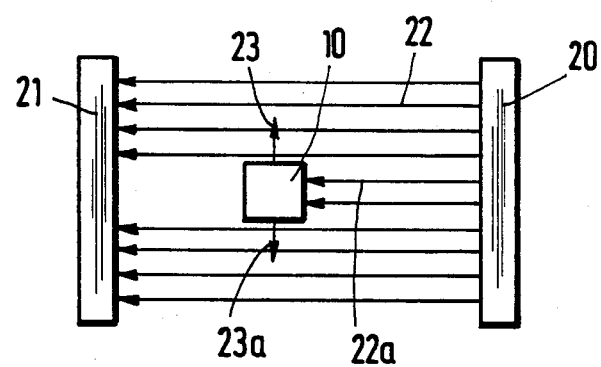
FIG. 4 shows light strips for detecting the overhead loop in the cooling path.

The shrinkage values occurring in the cooling path 14 may also be detected and ascertained by means of light strips, such as those shown in FIG. 4. The mode of operation of such a form of light strips will now be described.

Light rays 22 are emitted by a light source 20. Opposite the source 20 is a receiver 21 which comprises a plurality of discrete photoelectric cells. If a strip of material 10 is disposed between the light source and the receiver, the rays 22a do not reach the associated photoelectric cells. If the strip of material 10 moves in the direction of either of the arrows 23 or 23a, the particular photoelectric cells which receive light from the source 20 are altered. This change is detected by an electronic evaluation system. In the present case, such movement of the material 10 denotes the shrinkage.

I claim:

1. A method of monitoring shrinkage during production of elongate profile strips comprised of two or more mixtures of rubber which are separately extruded through extruding nozzles and thereafter combined in an extrusion head to form such profile strip, such profile strip undergoing substantial shrinkage when cooled after passing from said extrusion head, the method comprising the steps of:

(a) providing and storing in a central control unit the predetermined desired weight per unit length of the extruded profile strip and the desired shrinkage of the profile strip in a cooling zone;

(b) extruding a strip comprised of said two or more mixtures, and passing said strip over a weighing device to determine the weight per unit length of the strip;

(c) comparing the actual weight per unit length of said strip with the desired weight per unit length of said strip stored in said central control unit;

(d) modifying the feed rate of one or more of said mixtures to correlate said actual weight per unit length with the desired weight per unit length;

(e) passing said strip through a cooling zone in which longitudinal shrinkage occurs, said strip passing over a plurality of vertically spaced conveyor belts;

(f) measuring such shrinkage in said cooling zone as the strip passes from one conveyor belt to the next lower conveyor belt, and transmitting such measurement to said central control unit;

(g) comparing in said central control unit the actually measured shrinkage of said strip with the predetermined desired shrinkage stored in said central control unit; and (h) adjusting the feed rate of one or more of said mixtures based on the measured discrepancy between the actual and desired shrinkage in said strip so as to bring such shrinkage within a predetermined desired value.

2. The method of claim 1, wherein said measuring of the shrinkage of said strip in said cooling zone is effected by the detection of the position of pivotal arms interposed between superimposed conveyor belts and around which said strip passes from one belt to the next lower belt, the position of such arms determining the path of movement of said strip through said cooling zone.

3. The method of claim 1 further including the step of first passing said extruded strip through a shrinkage path comprised of inclined roller paths over which said strip passes before passing to said cooling zone, thereafter passing said strip over a second weighing device which measures the weight per unit length of the strip, comparing the weight per unit length with a predetermined desired weight per unit length, and adjusting the inclination of said roller paths based on such comparison.

* * * * *